United States Patent
Mennecke

(10) Patent No.: US 10,745,600 B2
(45) Date of Patent: Aug. 18, 2020

(54) SILANE-TERMINATED ADHESIVE FOR JOINING JOINTS IN THE NAVAL FIELD

(71) Applicant: SIKA TECHNOLOGY AG, Baar (CH)

(72) Inventor: Klaas Mennecke, Lottstetten (DE)

(73) Assignee: SIKA TECHNOLOGY AG, Baar (CH)

( * ) Notice: Subject to any disclaimer, the term of this patent is extended or adjusted under 35 U.S.C. 154(b) by 359 days.

(21) Appl. No.: 15/302,299

(22) PCT Filed: Apr. 10, 2015

(86) PCT No.: PCT/EP2015/057894
§ 371 (c)(1),
(2) Date: Oct. 6, 2016

(87) PCT Pub. No.: WO2015/155355
PCT Pub. Date: Oct. 15, 2015

(65) Prior Publication Data
US 2017/0029676 A1    Feb. 2, 2017

(30) Foreign Application Priority Data
Apr. 10, 2014 (EP) .................................. 14164126

(51) Int. Cl.
| | | |
|---|---|---|
| *C09J 175/08* | (2006.01) | |
| *C09J 171/02* | (2006.01) | |
| *C09J 175/04* | (2006.01) | |
| *C09J 201/10* | (2006.01) | |
| *C09J 5/00* | (2006.01) | |
| *C08G 18/75* | (2006.01) | |
| *C08G 65/336* | (2006.01) | |
| *C08G 18/28* | (2006.01) | |
| *C08G 18/76* | (2006.01) | |
| *C08G 18/48* | (2006.01) | |
| *C08G 65/333* | (2006.01) | |
| *B29C 70/68* | (2006.01) | |
| *B29C 70/74* | (2006.01) | |
| *C08G 18/22* | (2006.01) | |
| *C08G 18/34* | (2006.01) | |
| *C08G 18/66* | (2006.01) | |
| *C08G 18/83* | (2006.01) | |
| *B29K 83/00* | (2006.01) | |
| *B29K 105/20* | (2006.01) | |
| *B29K 711/14* | (2006.01) | |
| *B29L 31/30* | (2006.01) | |

(52) U.S. Cl.
CPC ........... *C09J 175/08* (2013.01); *B29C 70/682* (2013.01); *B29C 70/745* (2013.01); *C08G 18/222* (2013.01); *C08G 18/289* (2013.01); *C08G 18/341* (2013.01); *C08G 18/4825* (2013.01); *C08G 18/4866* (2013.01); *C08G 18/6692* (2013.01); *C08G 18/755* (2013.01); *C08G 18/76* (2013.01); *C08G 18/837* (2013.01); *C08G 65/336* (2013.01); *C08G 65/33348* (2013.01); *C09J 5/00* (2013.01); *C09J 171/02* (2013.01); *C09J 175/04* (2013.01); *C09J 201/10* (2013.01); *B29K 2083/00* (2013.01); *B29K 2105/20* (2013.01); *B29K 2711/14* (2013.01); *B29L 2031/3067* (2013.01); *C08G 2190/00* (2013.01); *C09J 2483/00* (2013.01)

(58) Field of Classification Search
CPC . C09J 175/08; C09J 5/00; C09J 171/02; C09J 175/04; C09J 201/10; C09J 2483/00
See application file for complete search history.

(56) References Cited

U.S. PATENT DOCUMENTS

| | | | |
|---|---|---|---|
| 3,971,751 A | 7/1976 | Isayama et al. | |
| 6,207,766 B1 | 3/2001 | Doi et al. | |
| 2009/0081470 A1* | 3/2009 | Jucker | C08G 18/10 428/447 |
| 2010/0059179 A1* | 3/2010 | Tribelhorn | C08G 18/10 156/314 |

(Continued)

FOREIGN PATENT DOCUMENTS

| | | | | |
|---|---|---|---|---|
| EP | 2055753 A1 * | 5/2009 | | C09J 5/00 |
| EP | 2055753 A1 | 5/2009 | | |
| EP | 2098548 A1 | 9/2009 | | |

(Continued)

OTHER PUBLICATIONS

Jun. 24, 2015 International Search Report issued in International Patent Application No. PCT/EP2015/057894.

(Continued)

*Primary Examiner* — Kelly M Gambetta
(74) *Attorney, Agent, or Firm* — Oliff PLC

(57) ABSTRACT

An adhesive which includes at least one silane-functional polymer P; at least one catalyst for crosslinking silane-functional polymers, the catalyst being selected from the group including organo-titanate, organo-zirconate, and organo-aluminate; at least one base; and at least one adhesive selected from alkoxy mercaptosilane and amino alkoxysilane, for filling wood joints. The adhesive filled into the joints is preferably sanded after the curing process. The adhesive exhibits a high UV stability and a stability against warm humid climates. The adhesive is therefore suitable for naval applications in particular, such as in the construction of boats and ships. The adhesive can be formulated so as to be black, white, or gray for example.

12 Claims, No Drawings

(56) References Cited

U.S. PATENT DOCUMENTS

2014/0179830 A1* 6/2014 Burckhardt ........... C08L 101/00
523/425

FOREIGN PATENT DOCUMENTS

| EP | 2248837 A1 * | 11/2010 | ........... C08G 18/289 |
| WO | 02/48228 A2 | 6/2002 | |
| WO | WO-2013030135 A1 * | 3/2013 | ............ C08L 101/00 |

OTHER PUBLICATIONS

Oct. 12, 2016 International Preliminary Report on Patentability issued in Internationl Patent Application No. PCT/EP2015/057894.

* cited by examiner

SILANE-TERMINATED ADHESIVE FOR JOINING JOINTS IN THE NAVAL FIELD

TECHNICAL FIELD

The present invention relates to the use of an adhesive for the grouting of wood joints, and also for a method for grouting the wood joint with the adhesive.

PRIOR ART

Compositions based on silane-functional polymers, and their use as adhesives, sealants or coatings, have been known for some considerable time and described in numerous instances. Also known is the use of mercaptosilanes in such compositions for the purpose of enhancing the adhesion to various substrates, thus enabling the substrates to be bonded, sealed or coated without prior application of a primer.

Thus, EP209854861, for example, describes a composition comprising a silane-functional polymer, 3-mercaptopropyltrimethoxysilane, and an organotitanate. This publication is concerned in particular with enhancing the adhesion properties on porous substrates.

Particularly for the filling or grouting of joints in the marine sector, a high level of UV stability is required. Further requirements of the materials used are sandability, high yellowing resistance, particularly in the case of white formulations, and stability under warm, damp conditions.

Polyurethanes in particular have been investigated before now for such applications. So that white formulations are also possible, an aliphatic polyurethane system must be used.

After the joints have been sanded down, commercial aliphatic polyurethane products are no longer stable and exhibit cracking after a short time, particularly when the products in question are white.

Where commercial silane-crosslinking products, especially white products, are used instead of aliphatic polyurethanes, a greater stability is obtained. Here as well, however, there are likewise cracks evident after 1000 h. Moreover, the stability under warm, damp conditions is inadequate.

The only formulations available on the market that meet the requirements identified above to date are black. The white and gray products on the market do not conform to the requirements of workability, UV stability, and stability with respect to warm, damp conditions.

SUMMARY OF THE INVENTION

The object of the present invention was to overcome the problems described above. In particular, the object lay in the provision of a composition which allows the grouting of wood joints and the sanding of the cured composition, with good workability, and, even after a sanding treatment, high UV stability and stability with respect to warm, damp conditions, particularly for marine applications, it also being possible for the composition to be given a white or gray formulation. Furthermore, the objective is to achieve a high yellowing stability, especially for white formulations.

Surprisingly it has now been found that this object can be achieved by the use of an adhesive based on a silane-functional polymer, operating without tin catalyst.

The present invention therefore relates to the use of an adhesive comprising at least one silane-functional polymer P,
at least one catalyst for the crosslinking of silane-functional polymers, selected from the group consisting of organotitanate, organozirconate, and organoaluminate;
at least one base; and
at least one adhesion promoter selected from alkoxymercaptosilane and aminoalkoxysilane for filling wood joints, the wood being natural or synthetic wood.

It is preferred for the adhesive filled into the wood joint to be sanded after having cured. The aim of sanding is to make the surface smooth. The adhesive used in accordance with the invention exhibits good workability and is sandable in the cured state. The adhesive used in accordance with the invention is therefore preferably a sandable adhesive.

A sandable adhesive is an adhesive which after having cured can be worked on with a belt sander which uses sandpaper with grain size 80. After sanding, there should be no sanding tracks visible on the adhesive, and a smooth surface must be present. Customary adhesives are frequently not sandable; in other words, when sanding takes place as indicated above, the cured adhesive "smears" and sanding tracks are produced, making the resulting surface unsmooth.

Surprisingly, the adhesive sanded after curing also exhibits high UV stability and very good stability with respect to a warm, damp atmosphere, and so is especially suitable for marine applications. These properties are even achieved, amazingly, when the adhesive is white or gray. The yellowing stability is very good, particularly in white formulations.

A further aspect of the invention is a corresponding method. Particularly preferred embodiments of the invention are subjects of the dependent claims.

WAYS OF PERFORMING THE INVENTION

Substance names beginning with "poly", such as polyol or polyisocyanate, in the present document identify substances which formally contain two or more per molecule of the functional groups that occur in their name.

The term "polymer" in the present document encompasses on the one hand a collective of chemically uniform macromolecules which nevertheless differ in respect of degree of polymerization, molar mass, and chain length, said collective having been prepared through a polymerization reaction (chain-growth addition polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically nonuniform. The term "moreover" further embraces what are called prepolymers, these being reactive oligomeric preadducts whose functional groups have participated in the construction of macromolecules.

The term "polyurethane polymer" also encompasses all polymers which are prepared by the process known as the diisocyanate polyaddition process. This also includes those polymers which are virtually free or entirely free from urethane groups. Examples of polyurethane polymers are polyether-polyurethanes, polyester-polyurethanes, polyether-polyureas, polyureas, polyester-polyureas, polyisocyanurates, and polycarbodiimides.

In the present document, the terms "silane" and "organosilane" respectively identify compounds which in the first instance have at least one, customarily two or three, hydrolyzable groups bonded directly to the silicon atom via Si—O— bonds, more particularly alkoxy groups or acyloxy groups, and in the second instance have at least one organic radical bonded directly to the silicon atom via an Si—C bond. Silanes with alkoxy or acyloxy groups are also known to the person skilled in the art as organoalkoxysilanes and organoacyloxysilanes, respectively. "Tetraalkoxysilanes", consequently, are not organosilanes under this definition.

Correspondingly, the term "silane group" refers to the silicon-containing group bonded to the organic silane radical bonded via the Si—C bond. The silanes, and their silane groups, have the property of undergoing hydrolysis on contact with moisture. In so doing, they form organosilanols, these being organosilicon compounds containing one or more silanol groups (Si—OH groups) and, by subsequent condensation reactions, organosiloxanes, these being organosilicon compounds containing one or more siloxane groups (Si—O—Si groups).

The term "silane-functional" refers to compounds which have silane groups. "Silane-functional polymers" accordingly, are polymers which have at least one silane group.

"Aminosilanes" and "mercaptosilanes" are terms used for organosilanes whose organic radical has at least one amino group or at least one mercapto group, respectively. The terms "organotitanate", "organozirconate", and "organoaluminate" in the present document identify compounds which have at least one ligand bonding via an oxygen atom to the titanium, zirconium, and aluminum atom, respectively.

A "multidentate ligand" or "chelate ligand" in the present document is a ligand which possesses at least two free electron pairs and is able to occupy at least two coordination sites on the central atom. A bidentate ligand, accordingly, is able to occupy two coordination sites on a central atom.

The term "primer" in the present document identifies a thin layer typically thinner than 1 mm, more particularly between 1 and 200 μm, preferably between 1 and 100 μm, of an adhesion promoter composition, which is applied as a preliminary coat to the surface of a substrate and results in an improvement in the adhesion of the adhesive to a substrate. Correspondingly, the terms "primeness" is used for the adhesive bonding, the grouting, sealing or coating of substrates without their pretreatment with a primer.

The "molecular weight" in the present document is understood always to refer to the molecular weight average Mn (number average), which can be determined by gel permeation chromatography (GPC).

In accordance with the invention, a specific adhesive is used for the filling of wood joints. The adhesive may more particularly be a moisture-curing adhesive, which cures in the presence of water, in the form for example of atmospheric moisture.

The adhesive comprises at least one silane-functional polymer P, which has preferably one, two or more groups, more preferably end groups, of the formula (I).

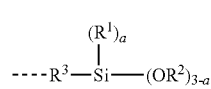
(I)

In this formula the radical $R^1$ is an alkyl group having 1 to 8 C atoms, more particularly a methyl group or an ethyl group.

The radical $R^2$ is an acyl or alkyl group having 1 to 5 C atoms, more particularly a methyl group or an ethyl group or an isopropyl group. Most preferably $R^2$ is an ethyl group.

The radical $R^3$ is a linear or branched, optionally cyclic, alkylene group having 1 to 12 C atoms, optionally with aromatic moieties, and optionally with 1 or more heteroatoms, more particularly with one or more nitrogen atoms.

The index a has a value of 0 or 1 or 2, more particularly a value of 0.

Within a silane group of the formula (I), $R^1$ and $R^2$, each independently of one another, are the radicals described. Thus, for example, possible compounds of the formula (I) include those which represent the ethoxy-dimethoxy-alkyl-silanes ($R^2$=methyl, $R^2$=methyl, $R^2$=ethyl).

In a first embodiment, the silane functional polymer P is a silane-functional polyurethane polymer P1, which is obtainable by the reaction of a silane having at least one group that is reactive toward isocyanate groups, with a polyurethane polymer which contains isocyanate groups. This reaction is carried out preferably in a stoichiometric ratio of the groups that are reactive toward isocyanate groups to the isocyanate groups of 1:1, or with a slight excess of groups that are reactive toward isocyanate groups, meaning that the resulting silane-functional polyurethane polymer P1 is preferably entirely free of isocyanate groups.

The silane which has at least one group that is reactive toward isocyanate groups is, for example, a mercaptosilane, an aminosilane or a hydroxysilane, more particularly an aminosilane. The aminosilane is preferably an aminosilane AS of the formula (Ia),

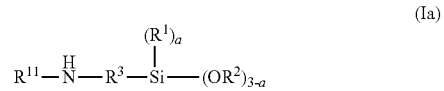
(Ia)

where $R^1$, $R^2$, $R^3$, and a have already been described above, and $R^{11}$ is a hydrogen atom or is a linear or branched hydrocarbon radical having 1 to 20 C atoms that optionally contains cyclic moieties, or is a radical of the formula (II).

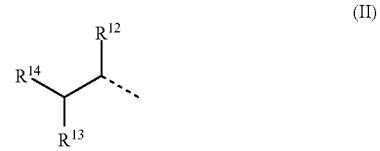
(II)

In this formula the radicals $R^{12}$ and $R^{13}$, independently of one another, are a hydrogen atom or a radical from the group encompassing —$R^{15}$, —CN, and —COOR$^{15}$.

The radical $R^{14}$ is a hydrogen atom or is a radical from the group encompassing —CH$_2$—COOR$^{15}$, —COOR$^{15}$, CONHR$^{15}$, —CON(R$^{15}$)$_2$, —CN, —NO$_2$, —PO(OR$^{15}$)$_2$, —SO$_2$R$^{15}$, and —SO$_2$OR$^{15}$.

The radical $R^{15}$ is a hydrocarbon radical having 1 to 20 C atoms that optionally comprises at least one heteroatom.

Examples of suitable aminosilanes AS are primary aminosilanes such as 3-aminopropyltriethoxysilane, 3-aminopropyldiethoxymethylsilane; secondary aminosilanes such as N-butyl-3-aminopropyltriethoxysilane, N-phenyl-3-aminopropyltriethoxysilane; the products of the Michael-like addition of primary aminosilanes such as 3-aminopropyltriethoxysilane or 3-aminopropyldiethoxymethylsilane onto Michael acceptors such as acrylonitrile, (meth)acrylic esters, (meth)acrylamides, maleic diesters and fumaric diesters, citraconic diesters and itaconic diesters, examples being dimethyl and diethyl N-(3-triethoxysilylpropyl)aminosuccinate; and also analogs of the stated aminosilanes having methoxy or isopropoxy groups instead of the preferred ethoxy groups on the silicon. Particularly suitable aminosilanes AS are secondary aminosilanes, more particularly aminosilanes AS in which $R^4$ in formula (III) is different from H. Preferred are the Michael-like adducts, more particularly diethyl N-(3-triethoxysilylpropyl)aminosuccinate.

The term "Michael acceptor" in the present document identifies compounds which on the basis of the double bonds they contain, activated by electron acceptor radicals, are capable of entering into nucleophilic addition reactions with primary amino groups ($NH_2$ groups) in a manner analogous to Michael addition (hetero-Michael addition).

Examples of suitable polyurethane polymers containing isocyanate groups for the preparation of a silane-functional polyurethane polymer P1 include polymers which are obtainable by the reaction of at least one polyol with at least one polyisocyanate, more particularly a diisocyanate. This reaction may take place by the polyol and the polyisocyanate being reacted by customary methods, as for example at temperatures of 50° C. to 100° C., optionally with accompanying use of suitable catalysts, the polyisocyanate being metered such that its isocyanate groups are present in a stoichiometric excess in relation to the hydroxyl groups of the polyol.

More particularly the excess of polyisocyanate is preferably selected such that in the resulting polyurethane polymer, after the reaction of all hydroxyl groups of the polyol, the remaining free isocyanate group content is from 0.1 to 5 wt %, preferably 0.1 to 2.5 wt %, more preferably 0.2 to 1 wt %, based on the overall polymer.

The polyurethane polymer may optionally be prepared with accompanying use of plasticizers, in which case the plasticizers used contain no groups that are reactive toward isocyanates.

Preferred polyurethane polymers with the stated amount of free isocyanate groups are those obtained from the reaction of diisocyanates with high molecular mass diols in an NCO:OH ratio of 1.5:1 to 2:1.

Suitable polyols for preparing the polyurethane polymer are, in particular, polyether polyols, polyester polyols, and polycarbonate polyols, and also mixtures of these polyols.

Especially suitable polyether polyols, also called polyoxyalkylene polyols or oligoetherols, are those which are polymerization products of ethylene oxide, 1,2-propylene oxide, 1,2- or 2,3-butylene oxide, oxetane, tetrahydrofuran, or mixtures thereof, optionally polymerized with the aid of a starter molecule having two or more active hydrogen atoms, such as water, ammonia, for example, or compounds having two or more OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the stated compounds. Use may be made both of polyoxyalkylene polyols which have a low degree of unsaturation (measured by ASTM D-2849-69 and expressed in milliequivalents of unsaturation per gram of polyol (meq/g)), prepared for example by means of double metal cyanide complex catalysts (DMC catalysts), and of polyoxyalkylene polyols having a higher degree of unsaturation, prepared for example by means of anionic catalysts such as NaOH, KOH, CsOH, or alkali metal alkoxides.

Particularly suitable are polyoxyethylene polyols and polyoxypropylene polyols, more particularly polyoxyethylene diols, polyoxypropylene diols, polyoxyethylene triols, and polyoxypropylene triols.

Especially suitable are polyoxyalkylene diols or polyoxyalkylene triols having a degree of unsaturation of less than 0.02 meq/g and having a molecular weight in the range from 1000 to 30 000 g/mol, and also polyoxyethylene diols, polyoxyethylene triols, polyoxypropylene diols, and polyoxypropylene triols having a molecular weight of 400 to 20 000 g/mol. Likewise particularly suitable are so-called ethylene oxide-terminated ("EO-endcapped", ethylene oxide-endcapped) polyoxypropylene polyols. The latter are special polyoxypropylene-polyoxyethylene polyols which are obtained, for example, by subjecting pure polyoxypropylene polyols, more particularly polyoxypropylene diols and triols, to further alkoxylation with ethylene oxide after the end of the polypropoxylation reaction, and which therefore have primary hydroxyl groups. Preferred in this case are polyoxypropylene-polyoxyethylene diols and polyoxypropylene-polyoxyethylene triols.

Additionally suitable are hydroxyl group terminated polybutadiene polyols, examples being those prepared by polymerization of 1,3-butadiene and allyl alcohol or by oxidation of polybutadiene, and their hydrogenation products.

Additionally suitable are styrene-acrylonitrile grafted polyether polyols, of the kind available commercially, for example, under the trade name Lupranol® from BASF Polyurethanes GmbH, Germany.

Especially suitable as polyester polyols are polyesters which carry at least two hydroxyl groups and are prepared by known processes, particularly by the polycondensation of hydroxycarboxylic acids or the polycondensation of aliphatic and/or aromatic polycarboxylic acids with dihydric or polyhydric alcohols.

Especially suitable polyester polyols are those prepared from di- to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane, or mixtures of the aforesaid alcohols, with organic dicarboxylic acids or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid, and trimellitic anhydride, or mixtures of the aforesaid acids, and also polyester polyols of lactones such as ε-caprolactone, for example.

Particularly suitable are polyester diols, especially those prepared from adipic acid, azelaic acid, sebacic acid, dodecanedicarboxylic acid, dimer fatty acid, phthalic acid, isophthalic acid, and terephthalic acid as dicarboxylic acid, or from lactones such as ε-caprolactone, for example, and from ethylene glycol, diethylene glycol, neopentyl glycol, 1,4-butanediol, 1,6-hexanediol, dimer fatty acid diol, and 1,4-cyclohexanedimethanol as dihydric alcohol.

Especially suitable polycarbonate polyols are those obtainable by reaction, for example, of the abovementioned alcohols, used for synthesis of the polyester polyols, with dialkyl carbonates such as dimethyl carbonate, diaryl carbonates such as diphenyl carbonate, or phosgene. Particularly suitable are polycarbonate diols, especially amorphous polycarbonate diols.

Other suitable polyols are poly(meth)acrylate polyols.

Likewise suitable, moreover, are polyhydrocarbon polyols, also called oligohydrocarbonols, examples being polyhydroxy-functional ethylene-propylene, ethylene-butylene or ethylene-propylene-diene copolymers, as produced for example by Kraton Polymers, USA, or polyhydroxy-functional copolymers of dienes such as 1,3-butanediene or diene mixtures and vinyl monomers such as styrene, acrylonitrile or isobutylene, or polyhydroxy-functional polybutadiene polyols, examples being those which are prepared by copolymerization of 1,3-butanediene and allyl alcohol and which may also have been hydrogenated.

Additionally suitable are polyhydroxy-functional acrylonitrile/butadiene copolymers of the kind preparable, for example, from epoxides or amino alcohols and carboxyl-terminated acrylonitrile/butadiene copolymers, which are available commercially under the name Hypro® (formerly Hycar® CTBN from Emerald Performance Materials, LLC, USA.

These stated polyols preferably have a molecular weight of 250 to 30 000 g/mol, more particularly of 1000 to 30 000 g/mol, and an average OH functionality in the range from 1.6 to 3.

Particularly suitable polyols are polyester polyols and polyether polyols, more particularly polyoxyethylene polyol, polyoxypropylene polyol, and polyoxypropylene-polyoxyethylene polyol, preferably polyoxyethylene diol, polyoxypropylene diol, polyoxyethylene triol, polyoxypropylene triol, polyoxypropylene-polyoxyethylene diol, and polyoxypropylene-polyoxyethylene trial.

Further to these stated polyols it is possible as well to use small amounts of low molecular weight dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher alcohols, low molecular weight alkoxylation products of the aforesaid dihydric and polyhydric alcohols, and also mixtures of the aforesaid alcohols, when preparing the polyurethane polymer having terminal isocyanate groups.

As polyisocyanates for the preparation of the polyurethane polymer it is possible to use commercially customary aliphatic, cycloaliphatic or aromatic polyisocyanates, more particularly diisocyanates. Suitable diisocyanates by way of example are those whose isocyanate groups are bonded in each case to one aliphatic, cycloaliphatic or arylaliphatic C atom, also called "aliphatic diisocyanates", such as 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane 1,3-diisocyanate, cyclohexane 1,4-diisocyanate, 1-isocyanato-3,3,5-trimethyl-5-isocyanatomethyl-cyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis (isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene; and also diisocyanates having isocyanate groups bonded in each case to one aromatic C atom, also called "aromatic diisocyanates", such as 2,4- and 2,6-tolylene diisocyanate (TDI), 4,4'-, 2,4'-, and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI); oligomers and polymers of the aforementioned isocyanates, and also any desired mixtures of the aforementioned isocyanates.

Suitable methoxysilane-functional polymers P1 are for example available commercially under the trade name Polymer ST50 from Hanse Chemie AG, Germany, and also under the trade name DesmoseaP by Bayer MaterialScience AG, Germany.

Ethoxysilane-functional polymers P1 are preferably used.

The silane-functional polymer P in a second embodiment is a silane-functional polyurethane polymer P2, obtainable through the reaction of isocyanotosilane IS with a polymer which has functional end groups that are reactive toward isocyanates, these end groups being more particularly hydroxyl groups, mercapto groups and/or amino groups. This reaction takes place in a stoichiometric ratio of the isocyanate groups to the functional end groups that are reactive toward isocyanate groups of 1:1, or with a slight excess of the functional end groups that are reactive toward isocyanate groups, at temperatures, for example, of 20° C. to 100° C., optionally with accompanying use of catalysts.

Suitability as isocyanatosilane IS is possessed by compounds of the formula (Ib)

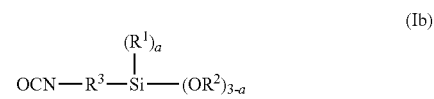

where $R^1$, $R^2$, $R^3$, and a have already been described earlier. Examples of suitable isocyanatosilanes IS of the formula (Ib) are 3-isocyanato-propyltriethoxysilane, 3-isocyanato-propyldiethoxymethylsilane, and their analogs with methoxy or isopropoxy groups in place of the ethoxy groups in the silica.

As functional end groups reactive toward isocyanate groups, the polymer preferably has hydroxyl groups. Suitable polymers having hydroxyl groups are, on the one hand, high molecular weight polyoxyalkylene polyols already identified, preferably polyoxypropylene diols having a degree of unsaturation of less than 0.02 meq/g and having a molecular weight in the range from 4000 to 30 000 g/mol, more particularly those having a molecular weight in the range from 8000 to 30 000 g/mol.

Also suitable on the other hand are polyurethane polymers having hydroxyl isocyanatosilanes IS of the formula (Ib). Polyurethane polymers of this kind are obtainable through the reaction of at least one polyisocyanate with at least one polyol. This reaction may be accomplished by bringing the polyol and the polyisocyanate to reaction by customary processes, at temperatures of 50° C. to 100° C., for example, optionally with accompanying use of suitable catalysts, the polyol being metered such that its hydroxyl groups are in a stoichiometric excess in relation to the isocyanate groups of the polyisocyanate. Preferred is a ratio of hydroxyl groups to isocyanate groups of 1.3:1 to 4:1, more particularly of 1.8:1 to 3:1. The polyurethane polymer may optionally be prepared with accompanying use of plasticizers, in which case the plasticizers used contain no groups reactive toward isocyanates. Suitable for this reaction are the same polyols and polyisocyanates already referenced as being suitable for the preparation of a polyurethane polymer containing isocyanate groups that is used for preparing a silane-functional polyurethane polymer P1.

Suitable methoxysilane-functional polymers P2 are for example available commercially under the trade names SPUR+® 1010LM, 1015LM, and 1050MM from Momentive Performance Materials Inc., USA, and also under the trade names Geniosil® STP-E15, STP-10, and STP-E35 from Wacker Chemie AG, Germany, and also under the trade name Incorez STP from Sika Incorez, UK. Ethoxysilane-functional polymers P2 are preferably used.

In a third embodiment, the silane-functional polymer P is a silane-functional polymer P3 which is obtainable by a hydrosilylation reaction of polymers, having terminal double bonds, examples being poly(meth)acrylate polymers or polyether polymers, more particularly of allyl-terminated polyoxyalkylene polymers, described for example in U.S. Pat. Nos. 3,971,751 and 6,207,766, the disclosure content of which is hereby included.

Suitable methoxysilane-functional polymers P3 are available commercially for example under the trade names MS-Polymer® S203(H), S303(H), S227, S810, MA903, and S943, Silyl® SAX220, SAX350, SAX400, and SAX725, Silyl® SAT350, and SAT400, and also XMAP® SA100S, and SA310S from Kaneka Corp., Japan, and also under the trade names Excestar® S2410, S2420, S3430, S3630, W2450, and MSX931 from Asahi Glass Co, Ltd., Japan. Ethoxysilane-functional polymers P3 are preferably used.

It is also possible, moreover, as silane-functional polymer P to use other silane-functional polymers that are available commercially, examples being those available under the trade name Tegopac® from Evonik Industries, more particularly Tegopac® Seal 100, Tegopac® Bond 150, Tegopac® Bond 250.

The silane-functional polymer P is customarily present in an amount of 10 to 80 wt %, preferably in an amount of 15 to 60 wt %, based on the overall adhesive.

The adhesive further comprises at least one catalyst for the crosslinking of silane-functional polymers, selected from the group consisting of organotitanate, organozirconate, and organoaluminate. These catalysts contain, in particular, alkoxy groups, sulfonate groups, carboxyl groups, dialkylphosphate groups, dialkylpyrophosphate and dialkyldiketonate groups.

Particularly suitable organotitanates are the following:
titanium(IV) complex compounds having two 1,3-diketonate ligands, especially 2,4-pentanedionate (i.e., acetylacetonate), and two alkoxide ligands;
titanium(IV) complex compounds having two 1,3-ketoesterate ligands, more particularly ethyl acetoacetate, and two alkoxide ligands;
titanium(IV) complex compounds having one or more amino alkoxide ligands, more particularly triethanolamine or 2-((2-aminoethyl)amino)ethanol, and one or more alkoxide ligands;
titanium(IV) complex compounds having four alkoxide ligands;
and also organotitanates with higher degrees of condensation, especially oligomeric titanium(IV) tetrabutoxide, also referred to as polybutyl titanate.

Especially suitable as alkoxide ligands are isobutoxy, n-butoxy, isopropoxy, ethoxy, and 2-ethylhexoxy. Especially suitable are bis(ethylacetoacetato)diisobutoxytitanium(IV), bis(ethylacetoacetato)diisopropoxytitanium(IV), bis(acetylacetonato)-diisopropoxytitanium(IV), bis(acetylacetonato) diisobutoxytitanium(IV), tris(oxyethyl)amineisopropoxytitanium(IV), bis[tris(oxyethyl)amine]diisopropoxytitanium(IV), bis(2-ethylhexane-1,3-dioxy)titanium(IV), tris[2-((2-aminoethyl)amino)ethoxy]ethoxytitanium(IV), bis(neopentyl(diallyl)oxydiethoxytitanium(IV), titanium(IV) tetrabutoxide, tetra-(2-ethylhexyloxy)titanate, tetra(isopropoxy)titanate, and polybutyl titanate. Especially suitable are the commercially available types Tyzor® AA, GBA, GBO, AA-75, AA-65, AA-105, DC, BEAT, BTP, TE, TnBT, KTM, TOT, TPT or IBAY (all from Du Pont/Dorf Ketal); Tytan PBT, TET, X85, TAA, ET, S2, S4 or S6 (all from TensoChema), and Ken-React® KR® TTS, 7, 9QS, 12, 26S, 33DS, 38S, 39DS, 44, 134S, 138S, 133DS, 158FS or LICA® 44 (all from Kenrich Petrochemicals).

Particularly suitable organozirconates are the commercially available types Ken-React® NZ® 38J, KZ® TPPJ, KZ® TPP, NZ® 01, 09, 12, 38, 44 or 97 (all from Kenrich Petrochemicals) and Snapcure® 3020, 3030, 1020 (all from Johnson Matthey & Brandenberger). A particularly suitable organoaluminate is the commercially available type K-Kat 5218 (from King Industries).

Most preferably the adhesive is substantially free from tin or organic tin compounds, since these on the one hand are not suitable for every application, for reasons of environment and toxicology.

The adhesive comprises preferably ≤0.1 wt %, more particularly ≤0.06 wt %, preferably ≤0.01 wt %, of tin or organic tin compounds. Most preferably the adhesive contains no tin and no organic tin compounds of the kind typically used for the curing of compositions based on silane-terminated polymers.

The proportion of a catalyst is preferably 0.1 to 10 wt %, more particularly 0.2 to 4 wt %, more preferably 0.3 to 3 wt %, most preferably 0.5 to 1.5 wt %, of the overall adhesive.

The adhesive further comprises at least one base. Especially suitable as base are nitrogen-containing compounds. The base more particularly is selected from guanidine, imidazole, imidazoline, bicyclic amidine, or from derivatives of these compounds.

Preferred are amines such as N-ethyldiisopropylamine, N,N,N',N'-tetrannethylalkylenediamines, polyoxyalkyleneamines, 1,4-diazabicyclo[2.2.2]octane; aminosilanes such as, in particular, 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyl-dimethoxysilane, N-(2-aminoethyl)-N'[3-(trimethoxysilyl)propyl]ethylendiamine and also analogs thereof with ethoxy groups or isopropoxy groups instead of the methoxy groups on the silicon; amidines such as, in particular, 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines such as, in particular, tetramethylguanidine, 2-guanidinobenzimidazole, acetylacetoneguanidine, 1,3-di-o-tolylguanidine, 2-tert-butyl-1,1,3,3-tetramethylguanidine; and imidazoles such as, in particular, N-(3-trimethoxysilylpropyl)-4,5-dihydroimidazole and N-(3-triethoxysilylpropyl)-4,5-dihydroimidazole.

The proportion of the base is preferably 0.01 to 3 wt %, more particularly 0.1 to 2 wt %, more preferably 0.2 to 1 wt % of the overall adhesive.

The adhesive further comprises at least one adhesion promoter selected from alkoxymercaptosilane and aminoalkoxysilane. Use may be made of one or more alkoxymercaptosilanes, one or more aminoalkoxysilanes, or mixtures of at least one alkoxymercaptosilane and at least one aminoalkoxysilane.

Suitability as aminoalkoxysilane is possessed preferably by aminosilanes AS of the formula (Ia) in which $R^2$ is an alkyl group having 1 to 5 C atoms, more particularly a methyl group or an ethyl group or an isopropyl group, most preferably an ethyl group, as were described above as a component for the silane-functional polymer, and so reference may be made to that description, including the preferred embodiments and specific examples given there, with the proviso that $R^2$ is an alkyl group.

The adhesion promoter is preferably an alkoxymercaptosilane and more preferably an ethoxymercaptosilane. In particular, the alkoxymercaptosilane is one of the formula (III).

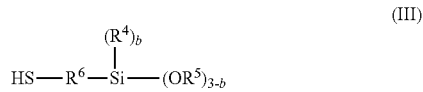

In this formula, the radical $R^4$ is an alkyl group having 1 to 8 C atoms, more particularly a methyl group.

The radical $R^6$ is an alkyl group having 1 to 5 C atoms, more particularly a methyl group or an ethyl group or an isopropyl group. Most preferably $R^6$ is an ethyl group.

The radical $R^6$ is a linear or branched, optionally cyclic, alkylene group having 1 to 20 C atoms, optionally having aromatic fractions, and optionally having one or more heteroatoms, especially nitrogen atoms.

b is a value of 0, 1 or 2, preferably 0.

Particularly preferred is an alkoxymercaptosilane of the formula (III) in which $R^6$ is an ethyl group, i.e., an ethoxymercaptosilane. The ethoxymercaptosilane is preferably 3-mercaptopropyltriethoxysilane or 3-mercaptopropyldiethoxy-methylsilane. In the adhesive the ethoxymercaptosilane may also be present in the form in which the mercapto group is in a blocked state, in the form of thiocarboxylate-functional silane, for example. In that case the mercapto group is liberated under curing reaction conditions, typically under the influence of water.

The proportion of the adhesion promoter, which is preferably an alkoxymercaptosilane, more preferably an ethoxymercaptosilane, is preferably 0.1 to 7 wt %, more particularly 0.2 to 4 wt %, more preferably 0.3 to 1.5 wt % of the overall adhesive.

The adhesive preferably further comprises a filler. The filler influences not only the rheological properties of the uncured adhesive but also the mechanical properties and the surface nature of the cured adhesive.

Suitable fillers are inorganic or organic fillers, examples being natural, ground or precipitated calcium carbonates, optionally with a coating of fatty acids, more particularly stearic acid; barium sulfate ($BaSO_4$, also called barytes or heavy spar), calcined kaolins, aluminum oxides, aluminum hydroxides, silicas, especially finely divided silicas from pyrolysis operations, carbon blacks, especially industrially produced carbon black, PVC powders or hollow beads. Preferred fillers are calcium carbonates, calcined kaolins, carbon black, finely divided silicas, and also flame-retardant fillers, such as hydroxides or hydrates, more particularly hydroxides or hydrates of aluminum, preferably aluminum hydroxide. It is entirely possible, and may even be an advantage, to use a mixture of different fillers.

A suitable amount of filler is situated for example in the range from 10 to 70 wt %, more particularly 15 to 60 wt %, preferably 30 to 60 wt %, based on the overall adhesive.

The adhesive may also comprise a tetraalkoxysilane, more particularly tetraethoxysilane, and in certain embodiments this may be advantageous.

Furthermore, the adhesive may additionally comprise other constituents. Such constituents are, for example, plasticizers such as esters of organic carboxylic acids or their anhydrides, such as phthalates, as for example dioctyl phthalate, diisononyl phthalate or diisodecyl phthalate, or hydrogenated phthalates, as for example Hexamoll DINCH, adipates, as for example dioctyl adipate, sulfonates, as for example Mesamoll (Lanxess), azelates and sebacates, polyols, as for example polyoxyalkylene polyols or polyester polyols, organic phosphoric and sulfonic esters, or polybutenes; solvents; fibers, of polyethylene, for example; dyes; pigments; rheological modifiers such as thickeners or thixotropic agents, examples being urea compounds of the kind described as thixotropic agents ("thixotropy endowning agent") in WO 02/48228 A2 on pages 9 to 11, polyamide waxes, bentonites, or fumed silicas; adhesion promoters, examples being epoxysilanes, (meth)acrylosilanes, anhydridosilanes or adducts of the aforesaid silane with primary aminosilanes, and also aminosilanes or urea silanes; crosslinkers, examples being silane-functional oligomers and polymers; drying agents, as for example tetraethoxysilane, vinyltriethoxysilane, α-functional silanes such as N-(silylmethyl)-O-methylcarbamates, more particularly N-(methyldiethoxy-silylmethyl)-O-methylcarbamate, (methacryloyloxymethyl)silanes, ethoxymethylsilanes, N-phenyl-, N-cyclohexyl-, and N-alkylsilanes, orthoamic esters, calcium oxide, or molecular sieves; stabilizers, to counter heat, light and UV radiation, for example; flame retardants; surface-active substances such as wetting agents, flow control agents, deaerating agents or defoamers; biocides such as algicides, fungicides or fungal growth inhibitor substances; and also other substances commonly used in moisture-curing compositions.

In one preferred embodiment the adhesive is substantially phthalate-free or phthalate-free. More particularly, the adhesive preferably contains no phthalate plasticizers. Preferred plasticizers are, for example, hydrogenated phthalates.

Furthermore, it is possible optionally to use what are called reactive diluents, which are incorporated into the polymer matrix during the curing of the adhesive, in particular through reaction with the silane groups.

The adhesive preferably comprises no constituents which eliminate methanol in the course of the curing. Such constituents, besides the silane-functional polymer P, are any reactive constituents present such as, for example, adhesion promoters, drying agents, reactive diluents, crosslinkers, and other constituents described above.

Constituents which do eliminate methanol during the curing are typically silane-functional compounds containing methoxy groups. The adhesive, then, preferably comprises no silane-functional compounds which contain methoxysilane groups. With preference, all of the silane-functional compounds present in the adhesive have end groups of the formula (I), with the radicals $R^1$, $R^2$, and $R^3$, and also the index a, having already been described above. Most preferably all hydrolyzable silane groups present in the composition are ethoxysilane groups, more particularly triethoxysilane groups.

In a most preferred embodiment, the silane-functional polymer P is a silane-functional polymer P1 and/or has only triethoxysilane groups as silane groups. Moreover, any additives present and comprising silane groups have silane groups which are preferably only triethoxysilane groups or alkyldiethoxysilane groups, more particularly methyl- or ethyldiethoxysilane groups, preferably triethoxysilane groups.

It is advantageous for all of the stated constituents optionally present in the adhesive, especially filler and catalyst, to be selected such that the storage stability of the composition is not adversely affected by the presence of any such constituent, in other words, such that the adhesive undergoes little or no change in its properties, particularly its application properties and curing properties, in the course of storage. This means that reactions, particularly of the silane groups, which lead to the chemical curing of the adhesive described do not occur to any significant extent during storage. It is therefore particularly advantageous for the stated constituents to contain only traces of water at most, or none, or to release no water, or only traces of water at most, during storage. Consequently it may be advisable to carry out chemical or physical drying of certain constituents before mixing them into the adhesive.

The adhesive described above is preferably produced and stored in the absence of moisture. Typically the adhesive is stable on storage, meaning that it can be kept in the absence of moisture in a suitable pack or system, such as a drum, a pouch or a cartridge, for example, over a period ranging from several months up to a year or more, without undergoing any change in its applications properties or in its properties after curing, to an extent relevant to its service. The stability on storage is determined customarily via measurement of the viscosity or of the extrusion force.

The adhesive may have any desired color, achieved for example by addition of suitable colorants, e.g., pigments and/or fillers. The adhesive is preferably black, beige, white or gray and more preferably white, black or gray, particularly preferably white or black.

The adhesive has for example a viscosity in the range from 20 to 1500 Pas, preferably 35 to 400 Pas, more preferably 35 to 200 Pas, at a temperature of 23° C. and a shear rate of 10 s$^{-1}$. The viscosity is measured using a RC30 from Rheotec with plate-plate configuration with a 0.05 mm gap.

The adhesive further preferably exhibits a flow in the vertical U-profile (2×2.5×20 cm) of less than 2 cm. For this determination, the U-profile of 2×2.5×20 cm, laid horizontally, is filled completely with the adhesive, with any adhesive swelling beyond the rim being carefully scraped off. After being filled, the U-profile is immediately stood up vertically. The adhesive then flows out for a certain distance at the bottom end. The extent of flow is determined at the lower end of the U-profile after 24 hours, using a centimeter rule. The test is conducted under standard conditions (23° C., 50% relative humidity).

The wood joint may be of natural or synthetic wood. The wood in question may be any desired natural or synthetic wood. The joint may also be of two or more different wood materials.

Natural wood is, for example, plywood, oak, robinia, elm, beech, kebony, oregon, and preferably tropical wood, such as teak, mahogany, iroko, padouk, afromosia, Brazilian pine, basralocus, cero, cordia, kahja, sipo, IPE, and doussie. Teak wood is particularly preferred. Synthetic wood comprises, for example, wood-plastic composite materials or wood particle materials, such as chipboard. Wood-plastic composite materials and wood particle materials are formed from wood remnants and wood wastes, such as byproducts of sawing, wood chips, wood shavings, wood flour or wood fibers, for example, and a binder, such as synthetic resin, a polyurethane or a silicone, for example, and optionally include additional additives, such as fillers. The wood remnants or wood wastes may be remnants or wastes of the natural woods named above. A preferred synthetic wood is formed from teak wood remnants or wastes.

In accordance with the invention the adhesive is used for the filling of wood joints, and here the adhesive may be employed primerlessly. The adhesive more particularly is a moisture-curing adhesive, which cures in the presence of water, especially in the form of atmospheric moisture. After the adhesive is cured, the cured adhesive can be sanded, as is also preferred.

The cured and sanded adhesive has a notably high UV stability and stability toward warm, damp conditions. The cured and sanded adhesive may be tested for its robustness using QUV testers or Suntesters. Suntesters and QUV testers from Q-Lab are commonplace weathering instruments.

The cured and sanded adhesive preferably exhibits no cracks after 3000 hours in the QUV tester or in the Suntester on 8-fold magnification. If the adhesive is white, gray or beige, it is further preferred for the cured and sanded adhesive, after 3000 hours in the QUV tester or in the Suntester, to exhibit a color difference delta E of less than 2, preferably less than 1.9, in comparison to the cured and sanded adhesive prior to weathering in the QUV tester or Suntester. For black adhesives, the color difference test is not rational.

The robustness in the QUV tester or Suntester is determined using the following method: first of all a sample is produced by filling a wood joint with the adhesive. Curing takes place at 23° C. and 50% relative humidity. After having been cured, the adhesive is sanded smooth using a belt sander with sandpaper of grain size 80. A color measurement is carried out on the fresh sanded sample. Thereafter the sample is subjected to 3000 h of weathering in the QUV tester or in the Suntester, and afterwards the weathered sample is investigated under 8-fold magnification for cracks, and the color measurement is repeated. The color measurements are carried out only for white, beige or gray adhesives. Using stencils, the color measurements can be carried out at the same position before and after. From the results of the color measurements before and after weathering, the color difference delta E is determined.

The color measurement and determination of the color difference delta E are carried out using a Konica Minolta CM600d, method: CSI 10° D65. Examination for cracks is made visually using a microscope with 8-fold magnification.

The weathering or aging of the adhesive samples in the QUV tester takes place in accordance with ISO11507 or ASTM6154 with UV-A fluorescent lamps, with a cycle of 6 h of irradiation at 60° C. black panel temperature followed by 2 h of condensation conditions at 50° C.

The weathering or aging of the adhesive samples in the Suntester (instrument: Atlas Suntester XLS) takes place in accordance with ISO11507 or ASTM6154 with a dose of 270 000 kJ/m$^2$, black panel temperature 70° C.

The adhesive preferably furthermore exhibits shrinkage of less than 5%. The shrinkage is determined in accordance with ISO 10563.

Use in accordance with the invention is particularly appropriate for applications in the marine or limnic sector, more particularly in the marine sector, especially for boatbuilding and shipbuilding or for repair of boats and ships, for decks for example.

The invention also relates to a method for grouting a wood joint, where the wood is natural or synthetic wood, the method comprising a) the filling of the wood joint with the adhesive used in accordance with the invention, b) the curing of the adhesive in the wood joint, and c) the sanding of the cured adhesive.

Curing may be carried out, for example, at temperatures in the range from 5 to 40° C. The curing time may vary depending on temperature and atmospheric humidity. After curing has taken place, the adhesive can be sanded to give a smooth surface. Even in the sanded state, the adhesive exhibits high UV stability, resistance toward warm, damp conditions, and good yellowing resistance, even if it is gray or, more particularly, white.

EXAMPLES

Measurement Methods

The viscosity and the flow of the adhesives produced were determined in accordance with the methods described above in the description. The stability was determined in the QUV tester or in the Suntester likewise in accordance with the techniques indicated in the description.

Example 1

Preparation of the Silane-Functional Polymer P

Under a nitrogen atmosphere, 700 g of Acclaim® 12200 polyol (Bayer MaterialScience AG, Germany; low monol polyoxypropylenediol; OH number 11.0 mg KOH/g; water content about 0.02 wt %), 32.1 g of isophorone diisocyanate (Vestanat® IPDI, Evonik Degussa GmbH, Germany), 85.4 g of 2,2,4-trimethyl-1,3-pentanediol diisobutyrate (Eastman TXIB™; Eastman Chemical Company, USA), and 0.4 g of Tyzor® IBAY (from DuPont, USA) were heated to 90° C. with continuous stirring, and left at this temperature. After a reaction time of an hour, the free isocyanate group content attained, by titration, was 0.7 wt %. Subsequently 0.14 mol (corresponding to a stoichiometric reaction of the NCO groups with silane) of reactive silane (Int-EtO) was added, and stirring was continued at 90° C. for a further 2 to 3 hours. The reaction was terminated when free isocyanate was no longer detectable by IR spectroscopy (2275-2230 $cm^{-1}$). The product was cooled to room temperature (23° C.) and kept in the absence of moisture (theoretical polymer content=90%).

The reactive silane Int-EtO (diethyl N-(3-triethoxysilyl-propyl)aminosuccinate) was prepared as follows: 100 g of 3-aminopropyltriethoxysilane (Dynasylan® AMEO from Evonik Degussa GmbH, Germany) were introduced. Added slowly with thorough stirring at room temperature were 77.8 g of diethyl maleate (Fluka Chemie GmbH, Switzerland), and the mixture was stirred at 60° C. for 12 hours.
Preparation of the Thixotropic Agent TM A vacuum mixer was charged with 1000 g of diisononyl 1,2-cyclohexanedicarboxylate (DINCH, Hexamoll® DINCH, BASF SE, Germany) and 160 g of 4,4'-diphenyl-methane diisocyanate (Desmodur® 44 MC L, Bayer MaterialScience AG, Germany) and this initial charge was gently heated. Then, with vigorous stirring, 90 g of monobutylamine were added slowly dropwise. The white paste which formed was stirred further for an hour under reduced pressure and with cooling. The thixotropic agent TM contains 20 wt % of thixotropic agent in 80 wt % of DINCH.
Production of the Adhesive In a vacuum mixer, 24 parts by weight of silane-functional polymer P, 7 parts by weight of diisononyl 1,2-cyclo-hexanedicarboxylate (DINCH, Hexamoll® DINCH, BASF SE, Germany), 17 parts by weight of thixotropic agent TM, and 1 part by weight of tetraethoxysilane (Dynasylan® A from Evonik Degussa GmbH, Germany) were mixed thoroughly for 5 minutes. Then 46 parts by weight of dried, precipitated chalk (Socal® U1S2, Solvay SA, Belgium) and 3 parts by weight of titanium dioxide (Kronos) were incorporated with kneading at 60° C. for 15 minutes. With the heating switched off, 0.5 part by weight of catalyst (Tyzor® IBAY, DuPont, USA, a titanium ethylacetoacetate complex), 0.5 part by weight of DBU (1,8-diazabicyclo[5.4.0]undec-7-ene, BASF), 1 part by weight of 3-mercaptopropyltri-ethoxysilane (Silquest® A1891, Momentive) were then processed to a homogeneous paste under reduced pressure for 10 minutes. The adhesive produced was then dispensed into internally coated aluminum gun-application cartridges.

The resulting adhesive is white. The viscosity, the flow in the U-profile, and the stability of the sanded joint in the QUV tester and in the Suntester were investigated. The results obtained were as follows:
Viscosity (23° C.): 300 Pas
Flow in the U-profile: 0.2 cm
Delta E after 3000 h in the Suntester or QUV tester: 1.5
No cracking in the sanded joint after 3000 h in the Suntester or QUV tester

Example 2

The production of the adhesive as in example 1 was repeated, except that 3 parts by weight of gray pigment were used rather than 3 parts by weight of titanium dioxide. In this way a gray adhesive was obtained. The tests from example 1 were repeated. The results obtained were as follows:
Viscosity (23° C.): 300 Pas
Flow in the U-profile: 0.3 cm
Delta E after 3000 h in the Suntester or QUV tester: 1.8
No cracking in the sanded joint after 3000 h in the Suntester or QUV tester

Example 3

The production of the adhesive as in example 1 was repeated, except that 3 parts by weight of carbon black were used rather than 3 parts by weight of titanium dioxide. In this way a black adhesive was obtained. The tests from example 1 were repeated, but delta E was not determined, since it is irrelevant for black materials. The results obtained were as follows:
Viscosity (23° C.): 400 Pas
Flow in the U-profile: 0.1 cm
No cracking in the sanded joint after 3000 h in the Suntester or QUV tester

Comparative Example 1

A commercially customary adhesive based on aliphatic polyurethane was investigated in the same way as the examples above, and the results obtained were as follows:
Viscosity (23° C.): 300 Pas
Flow in the U-profile: 0.2 cm
Delta E after 3000 h in the Suntester or QUV tester: 3
Cracking in the sanded joint after 3000 h in the Suntester or QUV tester; initial cracks were observed after just 500 h.

Comparative Example 2

A commercially customary adhesive based on a silane-terminated polymer was investigated in the same way as the examples above, and the results obtained were as follows:

Viscosity (23° C.): 300 Pas
Flow in the U-profile: 0.5 cm
Delta E after 3000 h in the Suntester or QUV tester: 2
Cracking in the sanded joint after 3000 h in the Suntester or QUV tester; initial cracks were observed after just 1000 h.

Comparative Example 3

The production of the adhesive in accordance with example 1 was repeated, except that the 24 parts by weight of silane-functional polymer P were replaced by 24 parts by weight of polymer ST 77 (commercial product from Evonik Hanse, methoxysilane-functional polyurethane polymer), 0.5 part by weight of Tyzor® BAY was replaced by 0.5 part by weight of DBTDL (10% strength solution of dibutyltin dilaurate in diisooctyl phthalate) as catalyst, and no DBU was used. In this way a white adhesive was obtained. The tests from example 1 were repeated. The results obtained were as follows:
Viscosity (23° C.): 300 Pas
Flow in the U-profile: 0.2 cm
Delta E after 3000 h in the Suntester or QUV tester: 2
Cracking in the sanded joint after 3000 h in the Suntester or QUV tester; initial cracks were observed after just 1000 h.

Comparative Example 4

The production of the adhesive as in example 1 was repeated, except that DBU was omitted and replaced by an additional 0.5 part by weight of DINCH. In this way a white adhesive was obtained. The tests from example 1 were repeated. The results obtained were as follows:
Viscosity (23° C.): 300 Pas
Flow in the U-profile: 0.3 cm
Delta E after 3000 h in the Suntester or QUV tester: 1.9
Cracking in the sanded joint after 3000 h in the Suntester or QUV tester; even during sanding, a slightly nonuniform surface was observed and the joint appeared to be very soft. Initial cracks were observed after 1000 h.

The invention claimed is:

1. An adhesive comprising
   at least one silane-functional polymer P;
   at least one catalyst for the crosslinking of silane-functional polymers, selected from the group consisting of organotitanate, organozirconate, and organoaluminate, wherein an amount of the at least one catalyst is from 0.01% to 10% by weight based on a total weight of the adhesive;
   at least one base, wherein the at least one base is selected from guanidine, imidazole, imidazoline, bicyclic amidine or from derivatives of these compounds, and wherein an amount of the at least one base is from 0.01% to 3% by weight based on the total weight of the adhesive; and
   at least one adhesion promoter selected from an alkoxymercaptosilane and an aminoalkoxysilane, wherein an amount of the at least one adhesion promoter is from 0.1% to 7% by weight based on the total weight of the adhesive,
   for filling wood joints, the wood being natural or synthetic wood, wherein
   the adhesive is sanded after having been cured,
   the adhesive is moisture-curing,
   the adhesive is produced and stored in the absence of moisture, and
   the adhesive is phthalate-free and comprises no Sn-based catalyst.

2. An adhesive as claimed in claim 1, wherein the cured and sanded adhesive, after 3000 hours in a QUV tester, with 8-fold magnification, shows no cracks, wherein, if the adhesive is white, beige or gray, the color difference delta E between the cured and sanded adhesive before weathering in the QUV tester and after the 3000 hours in the QUV tester is less than 2.

3. An adhesive as claimed in claim 1, wherein the silane-functional polymer P contains no methoxysilane groups.

4. An adhesive as claimed in claim 1, wherein the adhesion promoter is an ethoxymercaptosilane.

5. An adhesive as claimed in claim 1 for marine or limnic applications.

6. An adhesive as claimed in claim 1, wherein the adhesive is black, beige, white or gray.

7. An adhesive as claimed in claim 1, wherein the adhesive has a viscosity in the range from 20 to 1500 Pas at a temperature of 23° C. and a shear rate of 10 s$^{-1}$.

8. An adhesive as claimed in claim 1, wherein the adhesive exhibits a flow in the vertical U-profile (2×2.5×20 cm) of less than 2 cm.

9. An adhesive as claimed in claim 1, wherein the adhesive exhibits shrinkage of less than 5%.

10. A method for grouting a wood joint, the wood being natural or synthetic wood, comprising
    a) filling the wood joint with an adhesive,
    b) curing the adhesive in the wood joint, and
    c) sanding the cured adhesive,
    where the adhesive comprises the adhesive according to claim 1.

11. The method as claimed in claim 10, the wood joint being part of a marine or limnic article.

12. An adhesive as claimed in claim 1, wherein the at least one adhesion promoter is an alkoxymercaptosilane.

* * * * *